(12) United States Patent
Wu

(10) Patent No.: US 11,985,430 B2
(45) Date of Patent: May 14, 2024

(54) METHOD AND APPARATUS FOR DETERMINING EXPOSURE PARAMETER OF HEAD-MOUNTED DEVICE, AND DEVICE

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD. (CN)

( * ) Notice: Subject to any disclaimer, the term of this patent is extended or adjusted under 35 U.S.C. 154(b) by 109 days.

(21) Appl. No.: 17/763,000

(22) PCT Filed: Aug. 24, 2021

(86) PCT No.: PCT/CN2021/114365
§ 371 (c)(1),
(2) Date: Mar. 23, 2022

(87) PCT Pub. No.: WO2022/042567
PCT Pub. Date: Mar. 3, 2022

(65) Prior Publication Data
US 2022/0417411 A1 Dec. 29, 2022

(30) Foreign Application Priority Data
Aug. 24, 2020 (CN) .......................... 202010857729.6

(51) Int. Cl.
*H04N 23/73* (2023.01)
*H04N 23/71* (2023.01)
*H04N 23/76* (2023.01)
(52) U.S. Cl.
CPC ............. *H04N 23/73* (2023.01); *H04N 23/71* (2023.01); *H04N 23/76* (2023.01)
(58) Field of Classification Search
CPC ................................................ H04N 23/70–73
See application file for complete search history.

(56) References Cited

U.S. PATENT DOCUMENTS

2003/0184673 A1 10/2003 Skow
2007/0053607 A1* 3/2007 Mitsunaga ............... H04N 9/69
348/E5.073
(Continued)

FOREIGN PATENT DOCUMENTS

CN 106657806 A 5/2017
CN 108989689 A 12/2018
(Continued)

OTHER PUBLICATIONS

International Patent Application No. PCT/CN2021/114365, International Search Report dated Oct. 26, 2021, 8 pages with English Translation.
(Continued)

*Primary Examiner* — Frank Johnson

(57) ABSTRACT

A method and apparatus for determining an exposure parameter of a head-mounted device, and a device are provided. The method includes: acquiring an average real brightness value of a region of interest of the image of the current frame; determining an average predicted brightness value of a region of interest of an image of a next frame if the average predicted brightness value is smaller than a lower limit of a first preset threshold range, sequentially selecting exposure parameter values equal to or greater than a current exposure parameter value, in a target exposure list to form a target exposure sub-list; and if the average predicted brightness value is greater than or equal to an upper limit of the first preset threshold range, sequentially selecting exposure parameter values equal to or smaller than the current exposure parameter value in the target exposure list to form a target exposure sub-list.

20 Claims, 3 Drawing Sheets

(56) References Cited

U.S. PATENT DOCUMENTS

| | | | | |
|---|---|---|---|---|
| 2009/0174808 A1* | 7/2009 | Mochida | ............... | G03B 7/28 |
| | | | | 348/148 |
| 2010/0134650 A1* | 6/2010 | Kim | ............... | H04N 23/72 |
| | | | | 348/229.1 |
| 2013/0235232 A1 | 9/2013 | Yang et al. | | |
| 2019/0035047 A1* | 1/2019 | Lim | ............... | H04N 23/76 |
| 2019/0273859 A1 | 9/2019 | Yuan et al. | | |
| 2020/0348580 A1* | 11/2020 | Pan | ............... | H04N 23/71 |
| 2021/0144289 A1* | 5/2021 | Vdovychenko | ............... | H04N 23/60 |
| 2021/0166437 A1* | 6/2021 | LeGendre | ............... | G06T 19/20 |

FOREIGN PATENT DOCUMENTS

| | | | |
|---|---|---|---|
| CN | 110708472 | A | 1/2020 |
| CN | 111225160 | A | 6/2020 |
| CN | 111343388 | A | 6/2020 |
| CN | 112153360 | A | 12/2020 |
| JP | 2006317406 | A | 11/2006 |
| WO | 2011157245 | A2 | 12/2011 |

OTHER PUBLICATIONS

Partial Supplementary European Search Report and Opinion issued Feb. 15, 2024 in European Patent Application No. 21860402.3 (17 pages).

Anonymous, "Exponential smoothing," Wikipedia, Aug. 4, 2020, retrieved from: https://web.archive.orgweb/20200804202258/https://en.wikipedia.org/wiki/Exponential_smoothing#Triple_exponential_smoothing (8 pages).

* cited by examiner

METHOD AND APPARATUS FOR DETERMINING EXPOSURE PARAMETER OF HEAD-MOUNTED DEVICE, AND DEVICE

CROSS-REFERENCE TO RELATED APPLICATION

The present disclosure is a National Stage Filing of PCT Application No. PCT/CN2021/114365 filed on Aug. 24, 2021, which claims priority to Chinese Patent Application No. 202010857729.6, filed with the China National Intellectual Property Administration on Aug. 24, 2020 and entitled "Method and Apparatus for Determining Exposure Parameter of Head-Mounted Device, and Device", the disclosure of which is hereby incorporated by reference in its entirety.

TECHNICAL FIELD

The present disclosure relates to the field of image processing, and in particular, to a method for determining an exposure parameter of a head-mounted device, an apparatus for determining an exposure parameter of a head-mounted device, a head-mounted device, and a computer-readable storage medium.

BACKGROUND

Gesture recognition and tracking, Simultaneous Localization and Mapping (SLAM), spatial object recognition and tracking, and gamepad controller detection and tracking technologies have become an important part of human-computer interaction in the application of head-mounted devices (such as mixed reality head-mounted devices, augmented reality head-mounted devices and mixed reality devices). In the realization of gesture recognition and tracking, SLAM, spatial object recognition and tracking, and gamepad controller detection and tracking technologies, the quality of camera imaging in head-mounted devices is a key factor that directly affects the accuracy and delay of subsequent recognition and tracking.

At present, in order to improve key performances such as excellent recognition and tracking precision and time delay of gesture recognition and tracking, SLAM, spatial object recognition and tracking, and gamepad controller detection and tracking technologies, smooth transitions of brightness and darkness of two adjacent frames of images collected by cameras are generally expected, and contrast differences between images of consecutive frames from over brightness to over darkness or from over darkness to over brightness are not allowed. The solution in the related art for realizing smooth transition of brightness and darkness of two adjacent frames of images collected by a camera generally includes: providing a preset exposure table, setting an exposure parameter value in a polling mode according to the exposure parameter values in the exposure table until an average brightness value of an image collected by using a group of exposure parameter values approximates to a preset brightness value, ending exposure, and outputting an exposed image.

However, the head-mounted device is generally free to move at a certain speed, so that the variation of brightness and darkness between two adjacent frames of images is relatively severe, and it is difficult to make the average brightness value of the collected image approximates to the preset brightness value in a short time using the solution in the related art of setting exposure parameters in the exposure table in a polling mode. The gesture recognition and tracking, SLAM, spatial object recognition and tracking, and gamepad controller detection and tracking technologies will be negatively affected.

SUMMARY

Embodiments of the present disclosure provide a new technical solution for determining an exposure parameter of a head-mounted device.

According to a first aspect of the embodiments of the present disclosure, a method for determining an exposure parameter of a head-mounted device includes the following operations.

In a case where an image of a current frame is an image of an Nth frame or of a frame subsequent to the Nth frame, an average real brightness value of a region of interest of the image of the current frame is acquired. N is a positive integer greater than or equal to 2.

An average predicted brightness value of a region of interest of an image of a next frame is determined according to the average real brightness value and a preset smoothing algorithm.

In a case where the average predicted brightness value is smaller than a lower limit of a first preset threshold range, exposure parameter values equal to or greater than a current exposure parameter value are sequentially selected in a target exposure list to form a target exposure sub-list for the image of the next frame.

In a case where the average predicted brightness value is greater than or equal to an upper limit of the first preset threshold range, exposure parameter values equal to or smaller than the current exposure parameter value are sequentially selected in the target exposure list to form a target exposure sub-list for the image of the next frame.

In at least one exemplary embodiment, the method may further include an operation of acquiring the current exposure parameter value. The operation of acquiring the current exposure parameter value includes the following operations.

In a case where the image of the current frame is the image of the Nth frame or of a frame prior to the Nth frame, an exposure parameter value is set according to the target exposure list in a sequential polling mode until an average brightness value of a region of interest of the image of the current frame collected by using the corresponding exposure parameter value is within the first preset threshold range.

In a case where the image of the current frame is an image of a frame subsequent to the Nth frame, an exposure parameter value is set according to the target exposure sub-list for the image of the current frame in a sequential polling mode until an average brightness value of a region of interest of the image of the current frame collected by using the corresponding exposure parameter value is within the first preset threshold range.

The exposure parameter value corresponding to the image of the current frame is determined as the current exposure parameter value.

In at least one exemplary embodiment, the preset smoothing algorithm is a triple exponential smoothing algorithm.

In at least one exemplary embodiment, the method may further include an operation of acquiring the target exposure list. The operation of acquiring the target exposure list includes the following operations.

An initial exposure list of the head-mounted device is acquired.

A gain value in the target exposure list is determined according to a gain value in the initial exposure list.

Exposure durations in the initial exposure list are expanded to obtain exposure durations in the target exposure list.

Gain values corresponding to different exposure durations in the target exposure list are the same, and exposure parameter values in the target exposure list are arranged in an ascending order according to the corresponding exposure durations.

In at least one exemplary embodiment, the method may further include the following operations.

Scene images of M scenes are collected by using respective groups of exposure parameter values in the target exposure list. M is a positive integer greater than or equal to 1.

For each scene image of each scene, an offset of an average brightness value of a region of interest corresponding to the scene image deviating from the first preset threshold range is determined.

The number of scene images corresponding to offsets greater than a preset offset is counted.

In a case where the number is smaller than a preset threshold, it is determined that the head-mounted device is suitable for the corresponding scene.

In a case where a current scene is a scene for which the head-mounted device is suitable, the operation of acquiring, in a case where an image of a current frame is an image of an Nth frame or of a frame subsequent to the Nth frame, an average real brightness value of a region of interest of the image of the current frame is executed.

In at least one exemplary embodiment, the method may further include the following operations.

For a scene image of the scene for which the head-mounted device is suitable, a maximum exposure parameter value and a minimum exposure parameter value of the scene image corresponding to the offset smaller than or equal to the preset offset are determined.

The target exposure list is updated according to the maximum exposure parameter value and the minimum exposure parameter value.

In at least one exemplary embodiment, the head-mounted device is any one of a mixed reality device, an augmented reality device, or a virtual reality device.

In at least one exemplary embodiment, the average real brightness value is within the first preset threshold range.

In at least one exemplary embodiment, the target exposure list includes a pre-stored default exposure list.

In at least one exemplary embodiment, the operation that a gain value in the target exposure list is determined according to a gain value in the initial exposure list includes one of the following operations.

A minimum gain value in the initial exposure list is determined as the gain value in a real-time target exposure list.

All gain values in the initial exposure list are arranged in an ascending order, and any gain value in a preset percentage of gain values in the beginning of the arranged gain values is taken as the gain value in the target exposure list.

In at least one exemplary embodiment, the operation that exposure durations in the initial exposure list are expanded to obtain exposure durations in the target exposure list includes the following operations.

The exposure durations in the initial exposure list is fitted to obtain a curve of the exposure durations.

Two end points of the curve of the exposure durations are extended.

Exposure durations corresponding to the extended parts in the curve are added into a real-time initial exposure list to determine the exposure durations in the target exposure list.

According to a second aspect of the embodiments of the present disclosure, an apparatus for determining an exposure parameter of a head-mounted device is provided, which includes an acquisition module, a prediction module and a selection module.

The acquisition module is configured to acquire, in a case where an image of a current frame is an image of an Nth frame or of a frame subsequent to the Nth frame, an average real brightness value of a region of interest of the image of the current frame. N is a positive integer greater than or equal to 2.

The prediction module is configured to determine an average predicted brightness value of a region of interest of an image of a next frame according to the average real brightness value and a preset smoothing algorithm.

The selection module is configured to sequentially select, in a case where the average predicted brightness value is smaller than a lower limit of a first preset threshold range, exposure parameter values, which are equal to or greater than a current exposure parameter value, in a target exposure list to form a target exposure sub-list for the image of the next frame.

The selection module is further configured to sequentially select, in a case where the average predicted brightness value is greater than or equal to an upper limit of the first preset threshold range, exposure parameter values, which are equal to or smaller than the current exposure parameter value, in the target exposure list to form a target exposure sub-list for the image of the next frame.

According to a third aspect of the embodiments of the present disclosure, a head-mounted device is provided, which includes the apparatus described in the second aspect of the embodiments of the present disclosure.

Or, the head-mounted device includes a memory configured to store computer instructions and a processor configured to invoke the computer instructions from the memory to perform the method described in the first aspect of the embodiments of the present disclosure.

According to a fourth aspect of the embodiments of the present disclosure, a computer-readable storage medium is provided. The computer-readable storage medium has a computer program stored thereon which, when executed by a processor, implements the method described according to any of the first aspect.

In the embodiments of the present disclosure, in a case where an image of the current frame is an image of an Nth frame or of a frame subsequent to the Nth frame, it represents that the head-mounted device is possible to be moving at a certain motion speed. In such case, an average predicted brightness value of a region of interest of an image of a next frame is obtained based on an average real brightness value of a region of interest of the image of the current frame. In a case where the average predicted brightness value is smaller than a lower limit of a first preset threshold range, exposure parameter values equal to or greater than a current exposure parameter value are sequentially selected in a target exposure list to form a target exposure sub-list for the image of the next frame. In a case where the average predicted brightness value is greater than or equal to an upper limit of the first preset threshold range, exposure parameter values equal to or smaller than the current exposure parameter value are sequentially selected in the target exposure list to form a target exposure sub-list for the image of the next frame. Thus, since the number of the exposure parameters in the target exposure sub-list is smaller than the number of the exposure parameters in the target exposure list, the range of exposure parameter values among which selection is performed in the exposure process of the image of the next frame is reduced, so that the average brightness value of a region of interest of the image of the current frame can be within a first preset threshold range in a short time. That is, the average brightness value of the region of interest of the image of the current frame can approximate to a preset brightness value in a short time.

Through the following detailed description of the exemplary embodiments of the present disclosure with reference to the accompanying drawings, other features and advantages of the present disclosure will be clear.

BRIEF DESCRIPTION OF THE DRAWINGS

The accompanying drawings, which are incorporated in and constitute a part of this description, illustrate embodiments of the present disclosure and, together with the description, serve to explain the principles of the present disclosure.

DETAILED DESCRIPTION OF THE EMBODIMENTS

Various exemplary embodiments of the present disclosure will be described below in detail with reference to the accompanying drawings. It is to be noted that, unless specifically described otherwise, relative arrangements, numerical expressions, and numerical values of components and operations set forth in these embodiments do not limit the scope of the present disclosure.

The description below to at least one exemplary embodiment is actually only illustrative, and should not be taken as any limitation to the present disclosure and application or use thereof.

Technologies, methods and devices known by those having ordinary skill in the related art may not be discussed in detail. However, where appropriate, the technologies, the methods and the devices shall be regarded as part of the description.

In all examples shown and discussed herein, any specific values shall be interpreted as only exemplary values instead of limited values. As a result, other examples of the exemplary embodiments may have different values.

It is to be noted that similar marks and letters represent similar items in the following drawings. As a result, once a certain item is defined in one drawing, it is unnecessary to further discuss the certain item in the subsequent drawings.

Hardware Configuration Embodiment

Figure 1:
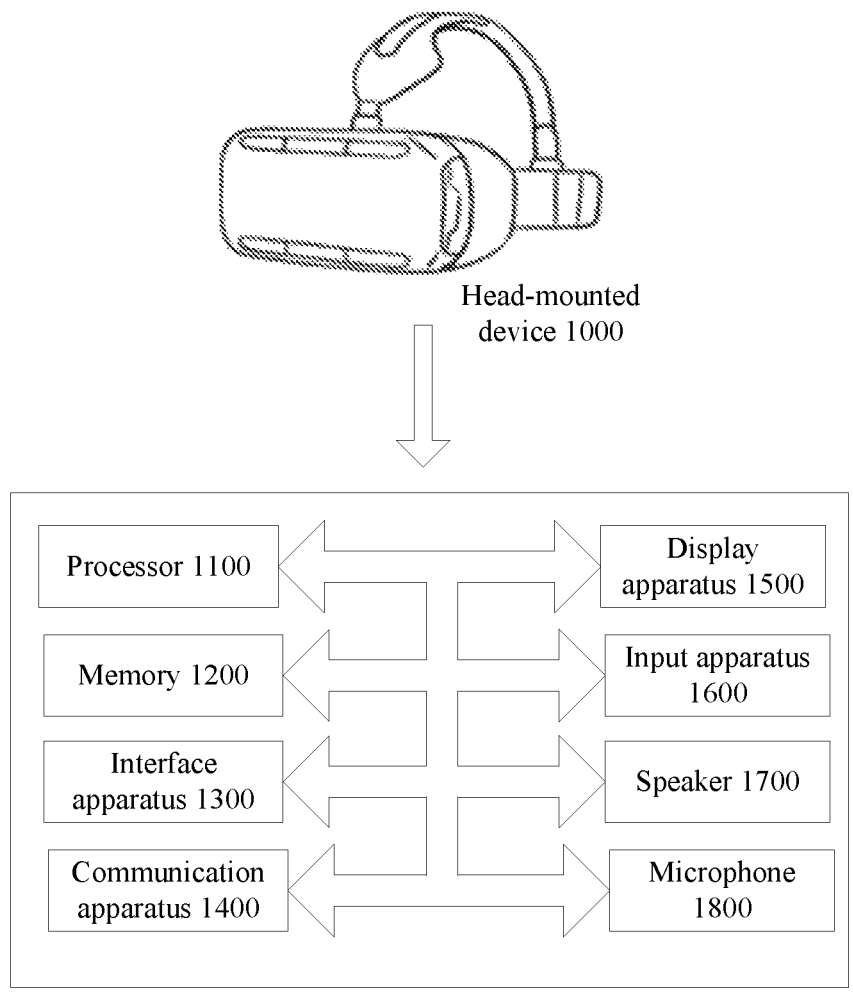
FIG. 1 is a block diagram of hardware configuration of a head-mounted device for implementing a method for determining an exposure parameter of a head-mounted device according to some embodiments of the present disclosure.

FIG. 1 is a block diagram of hardware configuration of a head-mounted device for implementing a method for determining an exposure parameter of a head-mounted device according to some embodiments of the present disclosure.

A head-mounted device 1000 may be a Virtual Reality (VR) head-mounted device, a Mixed Reality (MR) head-mounted device, or an Augmented Reality (AR) head-mounted device.

The head-mounted device 1000 may include a processor 1100, a memory 1200, an interface apparatus 1300, a communication apparatus 1400, a display apparatus 1500, an input apparatus 1600, a speaker 1700, a microphone 1800, and the like. The processor 1100 may be, for example, a Central Processing Unit (CPU), a Micro Control Unit (MCU), or the like. The memory 1200 includes, for example, a Read Only Memory (ROM), a Random Access Memory (RAM), a nonvolatile memory such as a hard disk, and the like. The interface apparatus 1300 includes, for example, a USB interface, a headphone interface, and the like. The communication apparatus 1400 can, for example, perform wired or wireless communication. The display apparatus 2500 is, for example, a liquid crystal display screen, a touch display screen, and the like. The input apparatus 1600 may include, for example, a touch screen, a keyboard, and the like. A user may input/output voice information through the speaker 1700 and the microphone 1800.

Although multiple apparatuses are shown in FIG. 1 for the head-mounted device 1000, the embodiments of the present disclosure may involve only some of the apparatuses. For example, the head-mounted device 1000 involves only to the memory 1200 and the processor 1100.

As used in the embodiments of the present disclosure, the memory 1200 of the head-mounted device 1000 is configured to store instructions for controlling the processor 1100 to perform a method of determining an exposure parameter of a head-mounted device according to some embodiments of the present disclosure.

In the above description, those having ordinary skill can design instructions according to the scheme disclosed in the embodiments of the present disclosure. How the instructions control the processor to operate is well known in the art and will not be described in detail herein.

Method Embodiment

Figure 2:
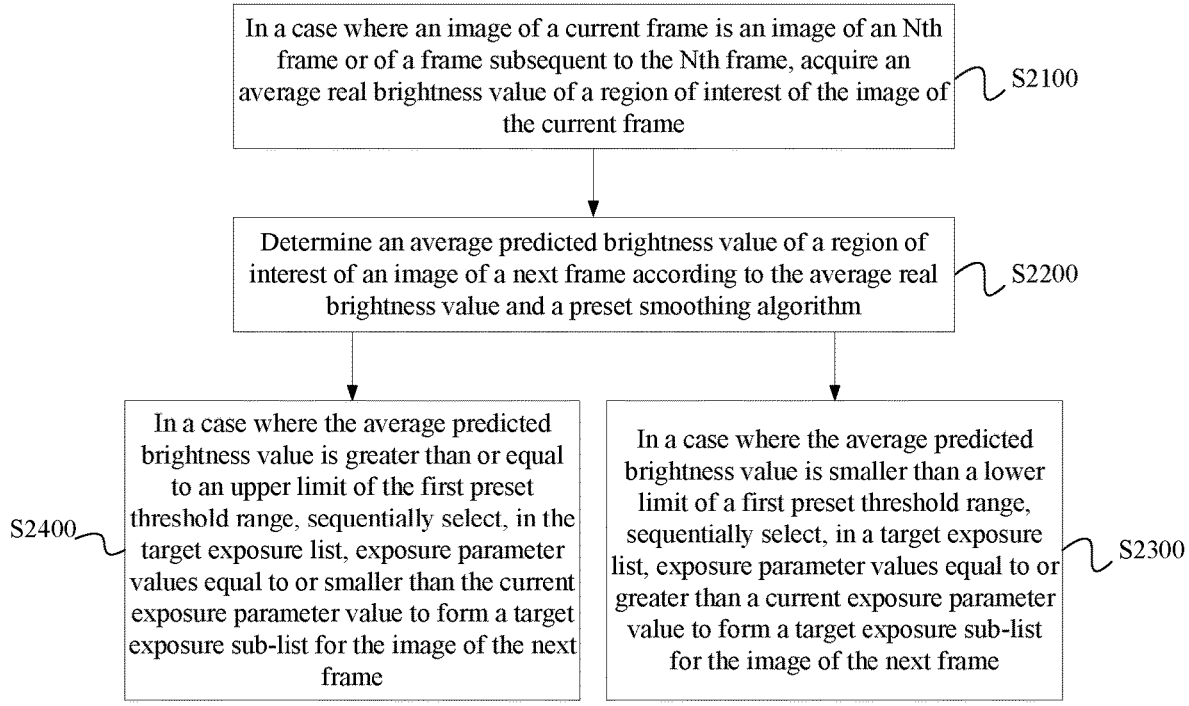
FIG. 2 is a flow chart of a method for determining an exposure parameter of a head-mounted device according to some embodiments of the present disclosure.

As shown in FIG. 2, an embodiment of the present disclosure provides a method of determining an exposure parameter of a head-mounted device. The head-mounted device may be any one of a mixed reality device, an augmented reality device, or a virtual reality device.

The method includes the following operations S2100-S2400.

At S2100, in a case where an image of a current frame is an image of an Nth frame or of a frame subsequent to the Nth frame, an average real brightness value of a region of interest of the image of the current frame is acquired.

N is a positive integer greater than or equal to 2.

In the embodiments of the present disclosure, in a case where an image of the current frame is an image of an Nth frame or of a frame subsequent to the Nth frame, it represents that the head-mounted device is possible to be moving at a certain motion speed. In such case, in order to make the average brightness value of the region of interest of the image of the current frame approximate to the preset brightness value in a short time, the method for determining an exposure parameter of a head-mounted device provided by the embodiment of the present disclosure is performed.

In addition, corresponding to S2100, in a case where the image of the current frame is the image of the Nth frame or of a frame prior to the Nth frame, it represents that the head-mounted device is in a state of just starting and low speed. In such case, an exposure parameter value is set according to the target exposure list in a sequential polling mode, so that the brightness value of a region of interest of the image of the current frame can be quickly within the first preset threshold range.

In the embodiment of the present disclosure, the first preset threshold range is a brightness value range approximating a preset brightness value.

In the embodiment of the present disclosure, the average real brightness value of the region of interest of the image of the current frame is used for representing the average real brightness value of the image of the current frame, so that the calculation amount of the head-mounted device can be effectively reduced.

In an embodiment, the region of interest of the image of the current frame may be a region in the image of the current frame, which is overlapped with the center of the image of the current frame, and has a length smaller than that of the image of the current frame and a width smaller than that of the image of the current frame.

In the embodiment of the present disclosure, since the average real brightness value in S2100 is within the first preset threshold range, the average real brightness value in S2100 may also be determined according to the first preset threshold range.

In the embodiments of the present disclosure, the calculation mode of the average brightness value of the image is known to those having ordinary skill in the art and will not be described in detail herein.

At S2200, an average predicted brightness value of a region of interest of an image of a next frame is determined according to the average real brightness value and a preset smoothing algorithm.

In the embodiment of the present disclosure, the preset smoothing algorithm is a method for obtaining a next predicted value according to a current observation value. The current observation value corresponds to the average real brightness value in S2100, and the next predicted value corresponds to the average predicted brightness value in S2200.

In an embodiment, the preset smoothing algorithm may be any one of a single exponential smoothing algorithm, a double exponential smoothing algorithm, or a triple exponential smoothing algorithm.

In one example, the preset smoothing algorithm is a triple exponential smoothing algorithm. The exemplary implementation of S2200 is illustrated by the following formula of the triple exponential smoothing algorithm:

$$S_t^2 = \alpha * S_t^1 + (1-\alpha) * S_t^2;$$

$$S_t^3 = \alpha * S_t^2 + (1-\alpha) * S_{t-1}^3;$$

$$b_t = 3 * S_t^1 - 3 * S_t^2 + S_t^3;$$

$$c_t = \alpha * ((6-5*\alpha) * S_t^1 - (10-8*\alpha) * S_t^2 + (4-3*\alpha) * S_t^3) / (2*(1-\alpha)^2);$$

$$d_t = \alpha^2 * (S_t^1 - 2S_t^2 + S_t^3)/(1-\alpha)^2;$$

$$F_{t+1} = b_t + c_t + d_t/2.$$

t represents the number of frames.

$S_t^1$ represents a single exponential smoothing value of the image of the current frame, which corresponds to the average real brightness value in S2100.

α is a smoothing coefficient. In the embodiment of the present disclosure, α may be set to 0.88.

$S_{t-1}^2$ is a double exponential smoothing value of a previous-frame image.

$S_t^2$ is a double exponential smoothing value of the image of the current frame.

$S_t^3$ is a triple exponential smoothing value of the image of the current frame.

$S_{t-1}^3$ is a triple exponential smoothing value of the previous-frame image.

$b_t$, $c_t$ and $d_t$ are intermediate quantities of the triple exponential smoothing algorithm.

$F_{t+1}$ represents the average predicted brightness value in S2200.

And, when t=1, $S_{t-1}^2 = S_{t-1}^3 = S_t^1$.

It is to be understood that when $S_{t-1}^2 = S_{t-1}^3 = S_t^1$ and $S_t^1$ is known, $S_{t-1}^2$ and $S_{t-1}^3$ are known.

At S2300, in a case where the average predicted brightness value is smaller than a lower limit of a first preset threshold range, exposure parameter values equal to or greater than a current exposure parameter value are sequentially selected in a target exposure list to form a target exposure sub-list for the image of the next frame.

The target exposure list includes multiple groups of exposure parameter values, each group of exposure parameter values including a gain and an exposure duration.

In an embodiment, the above target exposure list may be a default exposure list pre-stored by the head-mounted device.

Based on the above content, the method for determining an exposure parameter of a head-mounted device provided by the embodiments of the present disclosure may further include an operation of acquiring the current exposure parameter value. The operation includes the following operations S2310-S2312.

At S2310, in a case where the image of the current frame is the image of the Nth frame or of a frame prior to the Nth frame, an exposure parameter value is set according to the target exposure list in a sequential polling mode until an average brightness value of a region of interest of the image of the current frame collected by using the corresponding exposure parameter value is within the first preset threshold range.

In the embodiment of the present disclosure, in a case where the image of the current frame is the image of the Nth frame or of a frame prior to the Nth frame, it represents that the head-mounted device is in a state of just starting and low speed. In such case, an exposure parameter value is set according to the target exposure list in a sequential polling mode, so that the brightness value of a region of interest of the image of the current frame can be quickly within the first preset threshold range.

At S2311, in a case where the image of the current frame is an image of a frame subsequent to the Nth frame, an exposure parameter value is set according to the target exposure sub-list for the image of the current frame in a sequential polling mode until an average brightness value of a region of interest of the image of the current frame collected by using the corresponding exposure parameter value is within the first threshold range.

In the embodiments of the present disclosure, in a case where an image of the current frame is an image of a frame subsequent to an Nth frame, it represents that the head-mounted device is possible to be moving at a certain motion speed. In such case, the above operations S2100-S2400 are triggered to obtain the target exposure sub-list for the image of the current frame. Further, an exposure parameter value is set according to the target exposure sub-list in a sequential polling mode until an average brightness value of a region of interest of the image of the current frame collected by using the corresponding exposure parameter value is within the first threshold range.

At S2312, the exposure parameter value corresponding to the image of the current frame is determined as the current exposure parameter value.

In the embodiment of the present disclosure, the product of the gain and the exposure duration in the group of exposure parameter values is used to represent the magnitude of the exposure parameter value.

In the embodiment of the present disclosure, in a case where the average predicted brightness value is smaller than a lower limit of a first preset threshold range, it represents that when the current exposure parameter value is applied to an image of a next frame, an average brightness value of a region of interest of the image of the next frame is low. Therefore, the exposure parameter value of the image of the next frame needs to be greater than or equal to the current exposure parameter. On this basis, an exposure parameter list consisting of exposure parameter values equal to or greater than the current exposure parameter value in the target exposure list is used as a target exposure sub-list suitable for the image of the next frame.

At S2400, in a case where the average predicted brightness value is greater than or equal to an upper limit of the first preset threshold range, exposure parameter values equal to or smaller than the current exposure parameter value are sequentially selected in the target exposure list to form a target exposure sub-list for the image of the next frame.

In the embodiment of the present disclosure, when the average predicted brightness value is greater than or equal to an upper limit of a first preset threshold range, it represents that when the current exposure parameter value is applied to an image of a next frame, an average brightness value of a region of interest of the image of the next frame is high. Therefore, the exposure parameter value of the image of the next frame needs to be smaller than or equal to the current exposure parameter. On this basis, an exposure parameter list consisting of exposure parameter values, which are equal to or smaller than the current exposure parameter value, in the target exposure list is used as a target exposure sub-list suitable for the image of the next frame.

In the embodiments of the present disclosure, in a case where an image of the current frame is an image of an Nth frame or of a frame subsequent to the Nth frame, it represents that the head-mounted device is possible to be moving at a certain motion speed. In such case, an average predicted brightness value of a region of interest of an image of a next frame is obtained based on an average real brightness value of a region of interest of the image of the current frame. In a case where the average predicted brightness value is smaller than a lower limit of a first preset threshold range, exposure parameter values equal to or greater than a current exposure parameter value are sequentially selected in a target exposure list to form a target exposure sub-list for the image of the next frame. In a case where the average predicted brightness value is greater than or equal to an upper limit of the first preset threshold range, exposure parameter values equal to or smaller than the current exposure parameter value are sequentially selected in the target exposure list to form a target exposure sub-list for the image of the next frame. Thus, since the number of the exposure parameters in the target exposure sub-list is smaller than the number of the exposure parameters in the target exposure list, the range of exposure parameter values among which selection is performed in the exposure process of the image of the next frame is reduced, so that the average brightness value of a region of interest of the image of the current frame can be within a first preset threshold range in a short time. That is, the average brightness value of the region of interest of the image of the current frame can approximate to a preset brightness value in a short time.

In addition, experiments prove that when the exposure parameters are set based on the target exposure sub-list, the obtained average brightness value of the region of interest of the image may generally reach the first preset threshold range when the second or third exposure parameter value setting is performed. Thus, compared with a traditional mode that exposure parameters are set in a polling mode according to the target exposure list, the average brightness value of a region of interest of the image of the current frame can be quickly within the first preset threshold range.

In an embodiment, the above target exposure list is an exposure list that varies based on a default exposure list of the head-mounted device. Based on this, the embodiment of the present disclosure may further include an operation of acquiring the target exposure list. The operation includes the following operations S2510-S2512.

At S2510, an initial exposure list of the head-mounted device is acquired.

In the embodiment of the present disclosure, the initial exposure list of the head-mounted device is a default exposure list pre-stored in the head-mounted device.

At S2511, a gain value in the target exposure list is determined according to a gain value in the initial exposure list.

In the embodiment of the present disclosure, an exemplary implementation of S2511 may be to determine a minimum gain value in the initial exposure list as the gain value in the target exposure list.

Another exemplary implementation of S2511 may be to arrange all gain values in the initial exposure list in an ascending order, and take any gain value in a preset percentage of gain values in the beginning of the arranged gain values as the gain value in the target exposure list.

In the embodiment of the present disclosure, all gain values in the target exposure list are the same, i.e. gain values corresponding to different exposure durations in the target exposure list are the same.

In the embodiment of the present disclosure, by selecting a relatively small gain value in the initial exposure list as the gain value in the target exposure list, a signal-to-noise ratio of an image collected by the head-mounted device can be improved.

At S2512, exposure durations in the initial exposure list are expanded to obtain exposure durations in the target exposure list.

In the embodiment of the present disclosure, the exemplary implementation of S2512 may be to fit the exposure durations in the initial exposure list to obtain a curve of the exposure durations. Two end points of the curve of the exposure durations are extended. Exposure durations corresponding to the extended parts in the curve are added into the initial exposure list to obtain the target exposure list.

Exposure parameter values in the target exposure list are arranged in an ascending order according to the corresponding exposure durations.

In the embodiment of the present disclosure, the expansion of the initial exposure list is realized by expanding the exposure durations in the initial exposure list, so that the brightness range of the environment used by the head-mounted device can be increased. Specifically, the head-mounted device is enabled to be used in darker or brighter environments.

In an embodiment, the method for determining an exposure parameter of a head-mounted device provided by the embodiment of the present disclosure may further include the following operations S2520-S2524.

At S2520, scene images of M scenes are collected by using respective groups of exposure parameter values in the target exposure list. M is a positive integer greater than or equal to 1.

In the embodiment of the present disclosure, the M scenes may illustratively be: living rooms with lights on, bedrooms with lights on, offices with lights on, exhibition venues with lights on, factories with lights on, living rooms with lights off, bedrooms with lights off, offices with lights off, exhibition venues with lights off, factories with lights off, and the like.

It should be noted that the number of M scenes and the specific form are not limited in the embodiments of the present disclosure. The M scenes preferably cover all application scenes of the head-mounted device.

In one example, the target exposure list may include 40 groups of exposure parameter values, and M=260. Thus, 40*260 exposed scene images may be obtained based on S4320.

In an embodiment, the scene images of the M scenes may be pre-stored in the head-mounted device.

At S2521, for each scene image of each scene, an offset of an average brightness value of a region of interest corresponding to the scene image deviating from the first preset threshold range is determined.

At S2522, the number of scene images corresponding to offsets greater than a preset offset is counted.

In the embodiment of the present disclosure, the offset deviating from the first preset threshold refers to a difference between the average brightness value of the region of interest of the corresponding scene image and the upper limit when the average brightness value of the region of interest of the corresponding scene image is greater than the upper limit of the first preset threshold range, or a difference between the average brightness value of the region of interest of the corresponding scene image and the lower limit when the average brightness value of the region of interest of the corresponding scene image is smaller than the lower limit of the first preset threshold range.

In the embodiment of the present disclosure, the preset offset may be set empirically, and in one example, the preset offset may be set to 5 or 7.

At S2523, in a case where the number is smaller than a preset threshold, it is determined that the head-mounted device is suitable for the corresponding scene.

Corresponding to S2523, when the number is greater than or equal to the preset threshold, it is determined that the head-mounted device is not suitable for the corresponding scene.

In the embodiment of the present disclosure, the preset threshold may be set empirically.

Based on S2510-S2523, it is possible to determine one or more scenes for which the head-mounted device is suitable from the M scenes.

At S2524, in a case where a current scene is a scene for which the head-mounted device is suitable, the operation of acquiring, in a case where an image of a current frame is an image of an Nth frame or of a frame subsequent to the Nth frame, an average real brightness value of a region of interest of the image of the current frame is executed.

In the embodiment of the present disclosure, the current scene of the head-mounted device may be manually input into the head-mounted device by a user.

In the embodiment of the present disclosure, when the current scene of the head-mounted device is a scene for which the head-mounted device is suitable, the operation of acquiring, in a case where an image of a current frame is an image of an Nth frame or of a frame subsequent to the Nth frame, an average real brightness value of a region of interest of the image of the current frame is executed. Correspondingly, when the current scene of the head-mounted device is not a scene for which the head-mounted device is suitable, the operation of acquiring, in a case where an image of a current frame is an image of an Nth frame or of a frame subsequent to the Nth frame, an average real brightness value of a region of interest of the image of the current frame is not executed. Thus, the targeting and intelligence of the head-mounted device can be improved.

On the basis of the previous embodiment, the method for determining an exposure parameter of a head-mounted device provided by the embodiment of the present disclosure may further include the following operations S2525 and S2526.

At S2525, for a scene image of the scene for which the head-mounted device is suitable, a maximum exposure parameter value and a minimum exposure parameter value of the scene image corresponding to the offset smaller than or equal to the preset offset are determined.

In the embodiment of the present disclosure, after the scene used by the head-mounted device is determined on the basis of S2523, the scene images corresponding to the unsuitable scene are removed, and the scene images of the suitable scene in S2525 is obtained.

At S2526, the target exposure list is updated according to the maximum exposure parameter value and the minimum exposure parameter value.

In an embodiment, an exemplary implementation of S2526 may be to take an exposure parameter value equal to the maximum exposure parameter value determined in S2525 in the target exposure list, an exposure parameter value equal to the minimum exposure parameter value determined in S2525, and an exposure parameter value between the exposure parameter value equal to the maximum exposure parameter value determined in S2525 and the exposure parameter value equal to the minimum exposure parameter value determined in S2525 as the exposure parameter values in the target exposure list.

In another embodiment, another exemplary implementation of S2526 may be that: when the maximum exposure parameter value determined in S2525 is not the maximum exposure parameter value in the target exposure list and the minimum exposure parameter value determined in S2525 is not the minimum exposure parameter value in the target exposure list, a next exposure parameter value of the maximum exposure parameter value determined in S2525 in the target exposure list, a previous exposure parameter value of the minimum exposure parameter value determined in S2525 in the target exposure list, and a parameter value between the next exposure parameter value and the previous exposure parameter value are used as the exposure parameter values in the target exposure list.

In the embodiment of the present disclosure, the number of exposure parameter values in the target exposure list can be further reduced by S2525 and S2526, so that it is possible to achieve that the average brightness value of the region of interest of the image of the current frame approximates to a preset brightness value in a shorter time.

Apparatus Embodiment

Figure 3:
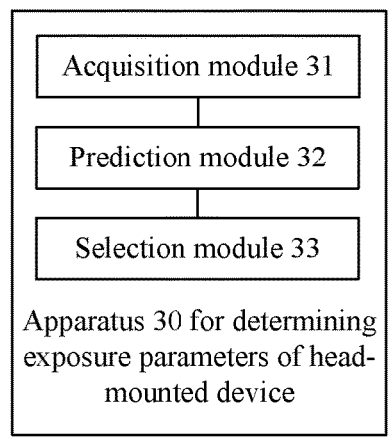
FIG. 3 is a schematic structural diagram of an apparatus for determining an exposure parameter of a head-mounted device according to some embodiments of the present disclosure.

An embodiment of the present disclosure provides an apparatus 30 for determining an exposure parameter of a head-mounted device. As shown in FIG. 3, the apparatus 30 includes an acquisition module 31, a prediction module 32 and a selection module 33.

The acquisition module 31 is configured to acquire, in a case where an image of a current frame is an image of an Nth frame or of a frame subsequent to the Nth frame, an average real brightness value of a region of interest of the image of the current frame. N is a positive integer greater than or equal to 2.

The prediction module 32 is configured to determine an average predicted brightness value of a region of interest of an image of a next frame according to the average real brightness value and a preset smoothing algorithm.

The selection module 33 is configured to sequentially select, in a case where the average predicted brightness value is smaller than a lower limit of a first preset threshold range, exposure parameter values, which are equal to or greater than a current exposure parameter value, in a target exposure list to form a target exposure sub-list for the image of the next frame.

The selection module is further configured to sequentially select, in a case where the average predicted brightness value is greater than or equal to an upper limit of the first preset threshold range, exposure parameter values, which are equal to or smaller than the current exposure parameter value, in the target exposure list to form a target exposure sub-list for the image of the next frame.

In an embodiment, the acquisition module 31 is further configured to set, in a case where the image of the current frame is the image of the Nth frame or of a frame prior to the Nth frame, exposure parameter values according to the target exposure list in a sequential polling mode until an average brightness value of a region of interest of the image of the current frame collected by using the corresponding exposure parameter value is within the first preset threshold range;

set, in a case where the image of the current frame is an image of a frame subsequent to the Nth frame, an exposure parameter value according to the target exposure sub-list for the image of the current frame in a sequential polling mode until an average brightness value of a region of interest of the image of the current frame collected by using the corresponding exposure parameter value is within the first preset threshold range; and determine the exposure parameter value corresponding to the image of the current frame as the current exposure parameter value.

In an embodiment, the preset smoothing algorithm is a triple exponential smoothing algorithm.

In an embodiment, the acquisition module 31 is further configured to perform the following operations.

An initial exposure list of the head-mounted device is acquired.

A gain value in the target exposure list is determined according to a gain value in the initial exposure list.

Exposure durations in the initial exposure list are expanded to obtain exposure durations in the target exposure list.

Gain values corresponding to different exposure durations in the target exposure list are the same, and exposure parameter values in the target exposure list are arranged in an ascending order according to the corresponding exposure durations.

In an embodiment, the apparatus 30 for determining an exposure parameter of a head-mounted device may further include an execution module configured to perform the following operations.

Scene images of M scenes are collected by using respective groups of exposure parameter values in the target exposure list. M is a positive integer greater than or equal to 1.

For each scene image of each scene, an offset of an average brightness value of a region of interest corresponding to the scene image deviating from the first preset threshold range is determined.

The number of scene images corresponding to offsets greater than a preset offset is counted.

In a case where the number is smaller than a preset threshold, it is determined that the head-mounted device is suitable for the corresponding scene.

In a case where a current scene is a scene for which the head-mounted device is suitable, the operation of acquiring, in a case where an image of a current frame is an image of an Nth frame or of a frame subsequent to the Nth frame, an average real brightness value of a region of interest of the image of the current frame is executed.

In an embodiment, the apparatus 30 for determining an exposure parameter of a head-mounted device may further include an update module configured to perform the following operations.

For a scene image of the scene for which the head-mounted device is suitable, a maximum exposure parameter value and a minimum exposure parameter value of the scene image corresponding to the offset smaller than or equal to the preset offset are determined.

The target exposure list is updated according to the maximum exposure parameter value and the minimum exposure parameter value.

In an embodiment, the head-mounted device is any one of a mixed reality device, an augmented reality device, or a virtual reality device.

Device Embodiment

Figure 4:
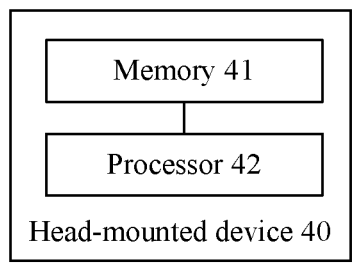
FIG. 4 is a schematic structural diagram of a head-mounted device according to some embodiments of the present disclosure.

An embodiment of the present disclosure also provides a head-mounted device 40. As shown in FIG. 4, the head-mounted device 40 includes the apparatus 30 for determining an exposure parameter of a head-mounted device as shown in FIG. 3.

Or, the head-mounted device includes a memory 41 and a processor 42. The memory 41 is configured to store computer instructions. The processor 42 is configured to invoke the computer instructions from the memory 41 to perform any method for determining an exposure parameter of a head-mounted device provided in the above method embodiment.

Storage Medium Embodiment

An embodiment the present disclosure also provides a computer-readable storage medium. The computer-readable storage medium has a computer program stored thereon which, when executed by a processor, implements any method for determining an exposure parameter of a head-mounted device provided in the above method embodiment.

The present disclosure may be embodied as a system, a method and/or a computer program product. The computer program product may include a computer-readable storage medium, in which a computer-readable program instruction configured to enable a processor to implement each aspect of the embodiments of the present disclosure is stored.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer-readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the embodiments of the present disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be concatenated to the computer of the user through any type of network including an LAN or a WAN, or may be concatenated to an external computer (for example, concatenated by an Internet service provider through the Internet). In some embodiments, an electronic circuit such as a programmable logic circuit, a Field Programmable Gate Array (FPGA), or a Programmable Logic Array (PLA) may be customized by use of state information of a computer-readable program instruction, and the electronic circuit may execute the computer-readable program instruction, thereby implementing each aspect of the embodiments of the present disclosure.

Herein, each aspect of the embodiments of the present disclosure is described with reference to flowcharts and/or block diagrams of the method, device (system) and computer program product according to the embodiments of the present disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to the computer, the other programmable data processing device or the other device, so that a series of operating operations are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method, and computer program product according to multiple embodiments of the present disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed substantially concurrently and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction. It is well known to those having ordinary skill in the art that implementation through hardware, implementation through software, and implementation through a combination of software and hardware are all equivalent.

Each embodiment of the present disclosure has been described above. The above descriptions are exemplary, non-exhaustive and also not limited to each disclosed embodiment. Many modifications and variations are apparent to those having ordinary skill in the art without departing from the scope and spirit of each described embodiment. The terms used herein are selected to explain the principle and practical application of each embodiment or improvements in the technologies in the market best or enable others of ordinary skill in the art to understand each embodiment disclosed herein. It is intended that the scope of the present disclosure is limited by the appended claims.

What is claimed is:

1. A method for determining an exposure parameter of a head-mounted device, comprising:
    capturing a plurality of image frames with a camera of the head-mounted device;
    when an image of a current frame is an image of an Nth frame or of a frame subsequent to the Nth frame, acquiring an average real brightness value of a region of interest of the image of the current frame, N being a positive integer greater than or equal to 2;
    determining an average predicted brightness value of a region of interest of an image of a next frame according to the average real brightness value and a preset smoothing algorithm;
    when the average predicted brightness value is smaller than a lower limit of a first preset threshold range, sequentially selecting exposure parameter values, which are equal to or greater than a current exposure parameter value, in a target exposure list to form a target exposure sub-list for the image of the next frame;
    when the average predicted brightness value is greater than or equal to an upper limit of the first preset threshold range, sequentially selecting exposure parameter values, which are equal to or smaller than the current exposure parameter value, in the target exposure list to form the target exposure sub-list for the image of the next frame; and
    applying to the image of the next frame an exposure parameter from the target exposure sub-list.

2. The method according to claim 1, further comprising acquiring the current exposure parameter value, wherein acquiring the current exposure parameter value comprises:
    when the image of the current frame is the image of the Nth frame or of a frame prior to the Nth frame, setting an exposure parameter value according to the target exposure list in a sequential polling mode until an average brightness value of a region of interest of the image of the current frame collected by using the corresponding exposure parameter value is within the first preset threshold range;
    when the image of the current frame is an image of a frame subsequent to the Nth frame, setting the exposure parameter value according to the target exposure sub-list for the image of the current frame in a sequential polling mode until an average brightness value of a region of interest of the image of the current frame collected by using the corresponding exposure parameter value is within the first preset threshold range; and
    determining the exposure parameter value corresponding to the image of the current frame as the current exposure parameter value.

3. The method according to claim 1, wherein the preset smoothing algorithm is a triple exponential smoothing algorithm.

4. The method according to claim 1, further comprising acquiring the target exposure list, wherein acquiring the target exposure list comprises:
    acquiring an initial exposure list of the head-mounted device;
    determining a gain value in the target exposure list according to a gain value in the initial exposure list; and
    expanding exposure durations in the initial exposure list to obtain exposure durations in the target exposure list,
    wherein gain values corresponding to different exposure durations in the target exposure list are the same, and exposure parameter values in the target exposure list are arranged in an ascending order according to the corresponding exposure durations.

5. The method according to claim 1, further comprising:
    collecting scene images of M scenes by using respective groups of exposure parameter values in the target exposure list, M being a positive integer greater than or equal to 1;
    determining, for each scene image of each scene, an offset of an average brightness value of a region of interest corresponding to the scene image deviating from the first preset threshold range;
    counting the number of scene images corresponding to offsets greater than a preset offset;
    when the number is smaller than a preset threshold, determining that the head-mounted device is suitable for the corresponding scene; and
    when a current scene is a scene for which the head-mounted device is suitable, executing the operation of acquiring, in a case where an image of a current frame is an image of an Nth frame or of a frame subsequent to the Nth frame, an average real brightness value of a region of interest of the image of the current frame.

6. The method according to claim 5, further comprising:
    determining, for a scene image of the scene for which the head-mounted device is suitable, a maximum exposure parameter value and a minimum exposure parameter value of the scene image corresponding to the offset smaller than or equal to the preset offset; and
    updating the target exposure list according to the maximum exposure parameter value and the minimum exposure parameter value.

7. The method according to claim 1, wherein the head-mounted device is any one of a mixed reality device, an augmented reality device, or a virtual reality device.

8. The method according to claim 1, wherein the average real brightness value is within the first preset threshold range.

9. The method according to claim 1, wherein the target exposure list comprises a pre-stored default exposure list.

10. The method according to claim 4, wherein determining a gain value in the target exposure list according to a gain value in the initial exposure list comprises one of the following:
    determining a minimum gain value in the initial exposure list as the gain value in a real-time target exposure list; and
    arranging all gain values in the initial exposure list in an ascending order, and determining any gain value in a preset percentage of gain values in the beginning of the arranged gain values as the gain value in the target exposure list.

11. The method according to claim 4, wherein expanding exposure durations in the initial exposure list to obtain exposure durations in the target exposure list comprises:

fitting the exposure durations in the initial exposure list to obtain a curve of the exposure durations;
extending two end points of the curve of the exposure durations; and
adding exposure durations corresponding to the extended parts in the curve into a real-time initial exposure list to determine the exposure durations in the target exposure list.

12. An apparatus for determining an exposure parameter of a head-mounted device, comprising a memory storing instructions and a processor in communication with the memory, wherein the processor is configured to execute the instructions to:
acquire a plurality of image frames captured by a camera of the head-mounted device;
acquire, in a case where an image of a current frame is an image of an Nth frame or of a frame subsequent to the Nth frame, an average real brightness value of a region of interest of the image of the current frame, N being a positive integer greater than or equal to 2;
determine an average predicted brightness value of a region of interest of an image of a next frame according to the average real brightness value and a preset smoothing algorithm;
sequentially select, when the average predicted brightness value is smaller than a lower limit of a first preset threshold range, exposure parameter values, which are equal to or greater than a current exposure parameter value, in a target exposure list to form a target exposure sub-list for the image of the next frame;
sequentially select, when the average predicted brightness value is greater than or equal to an upper limit of the first preset threshold range, exposure parameter values, which are equal to or smaller than the current exposure parameter value, in the target exposure list to form a target exposure sub-list for the image of the next frame; and
apply to the image of the next frame an exposure parameter from the target exposure sub-list.

13. A head-mounted device, comprising the apparatus according to claim 12.

14. A non-transitory computer-readable storage medium, having a computer program stored thereon which, when executed by a processor, implements the method according to claim 1.

15. A head-mounted device, comprising a memory configured to store computer instructions and a processor configured to invoke the computer instructions from the memory to perform the method according to claim 1.

16. The apparatus for determining an exposure parameter of a head-mounted device according to claim 12, wherein the processor is further configured to execute the instructions to acquire the current exposure parameter value in a following manner:
when the image of the current frame is the image of the Nth frame or of a frame prior to the Nth frame, setting an exposure parameter value according to the target exposure list in a sequential polling mode until an average brightness value of a region of interest of the image of the current frame collected by using the corresponding exposure parameter value is within the first preset threshold range;
when the image of the current frame is an image of a frame subsequent to the Nth frame, setting the exposure parameter value according to the target exposure sub-list for the image of the current frame in a sequential polling mode until an average brightness value of a region of interest of the image of the current frame collected by using the corresponding exposure parameter value is within the first preset threshold range; and
determining the exposure parameter value corresponding to the image of the current frame as the current exposure parameter value.

17. The apparatus for determining an exposure parameter of a head-mounted device according to claim 12, wherein the preset smoothing algorithm is a triple exponential smoothing algorithm.

18. The apparatus for determining an exposure parameter of a head-mounted device according to claim 12, wherein the processor is further configured to execute the instructions to acquire the target exposure list in a following manner:
acquiring an initial exposure list of the head-mounted device;
determining a gain value in the target exposure list according to a gain value in the initial exposure list; and
expanding exposure durations in the initial exposure list to obtain exposure durations in the target exposure list,
wherein gain values corresponding to different exposure durations in the target exposure list are the same, and exposure parameter values in the target exposure list are arranged in an ascending order according to the corresponding exposure durations.

19. The apparatus for determining an exposure parameter of a head-mounted device according to claim 12, wherein the processor is further configured to execute the instructions to:
collect scene images of M scenes by using respective groups of exposure parameter values in the target exposure list, M being a positive integer greater than or equal to 1;
determine, for each scene image of each scene, an offset of an average brightness value of a region of interest corresponding to the scene image deviating from the first preset threshold range;
count the number of scene images corresponding to offsets greater than a preset offset;
when the number is smaller than a preset threshold, determine that the head-mounted device is suitable for the corresponding scene; and
when a current scene is a scene for which the head-mounted device is suitable, execute the operation of acquiring, in a case where an image of a current frame is an image of an Nth frame or of a frame subsequent to the Nth frame, an average real brightness value of a region of interest of the image of the current frame.

20. The apparatus for determining an exposure parameter of a head-mounted device according to claim 19, wherein the processor is further configured to execute the instructions to:
determine, for a scene image of the scene for which the head-mounted device is suitable, a maximum exposure parameter value and a minimum exposure parameter value of the scene image corresponding to the offset smaller than or equal to the preset offset; and
update the target exposure list according to the maximum exposure parameter value and the minimum exposure parameter value.

* * * * *